(No Model.) 2 Sheets—Sheet 1.

A. L. SCHMIDT.
VEHICLE WHEEL.

No. 514,502. Patented Feb. 13, 1894.

Witnesses Inventor (No Model.)  2 Sheets—Sheet 2.
A. L. SCHMIDT.
VEHICLE WHEEL.
No. 514,502. Patented Feb. 13, 1894.
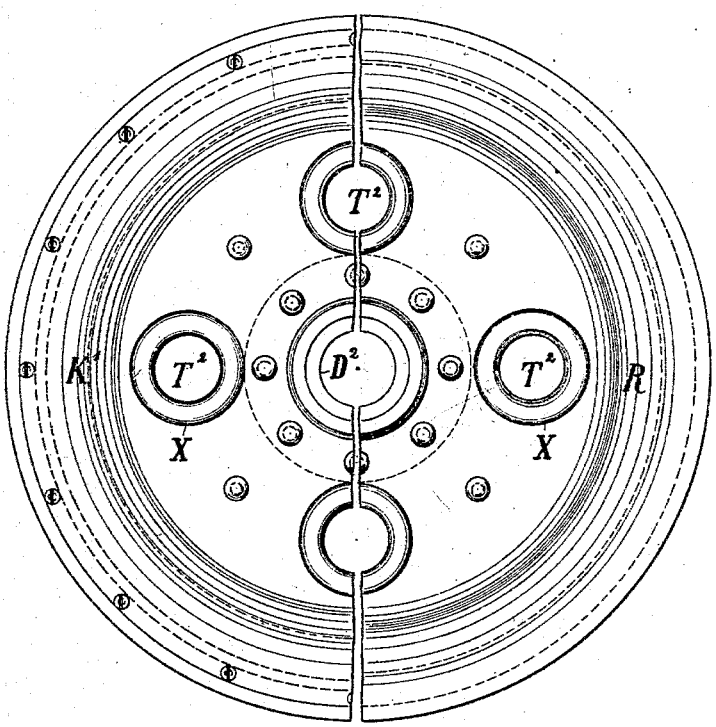
Fig:5.
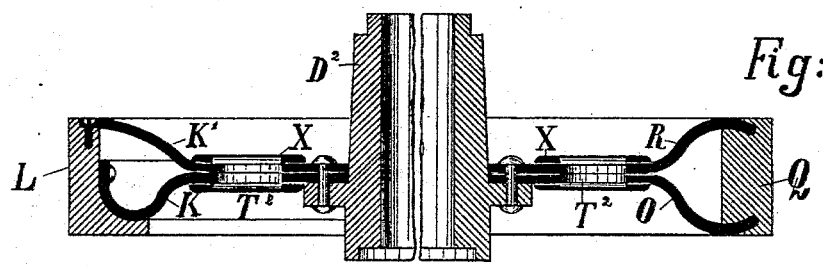
Fig:5a.
Witnesses.  Inventor.

UNITED STATES PATENT OFFICE.

AUGUST LUDWIG SCHMIDT, OF DUSSELDORF, GERMANY.

VEHICLE-WHEEL.

SPECIFICATION forming part of Letters Patent No. 514,502, dated February 13, 1894.

Application filed May 26, 1892. Serial No. 434,487. (No model.)

*To all whom it may concern:*

Be it known that I, AUGUST LUDWIG SCHMIDT, a subject of His Majesty the Emperor of Germany, residing at Dusseldorf, in the Province of Rhenish Prussia, Germany, have invented certain new and useful Improvements in Making Wheels for Carts and other Vehicles of Transport; and I do hereby declare that the following is a full, clear, and exact description of the invention, which will enable others skilled in the art to which it appertains to make and use the same.

In my new process the spokes are dispensed with, and in their place I use a wrought iron or steel disk, pressed out of plates in proper shape which I fix to a suitable boss and round which the jaunt or rim is secured. According to the use of the wheel, whether for light or heavy loads, the disk is used singly only or, where great strength and stability are required, two such disks are used together which are surrounded by the rim in a similar manner.

Variations in detail may be required, but the principle of my invention is always based on the use of a wrought iron or steel disk fixed to a central boss and surrounded by a suitably shaped rim.

My process of making wheels will be best understood by giving a few examples and explaining by means of description and drawings how I proceed in making them.

Figure 1A:
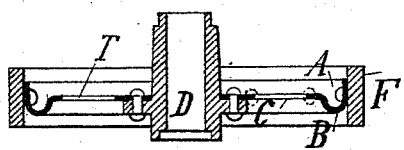
Figure 3A:
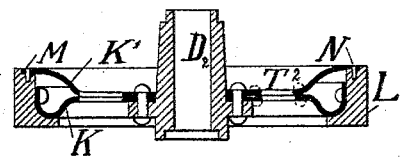
Figure 1B:
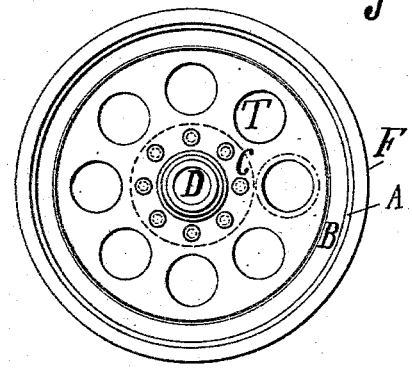
Figure 3B:
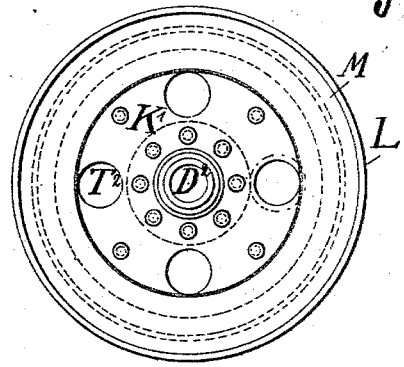
Figure 2A:
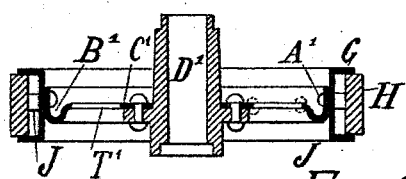
Figure 4A:
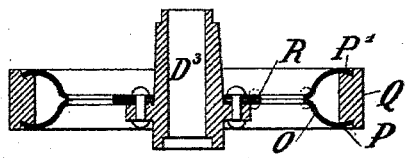
Figure 2B:
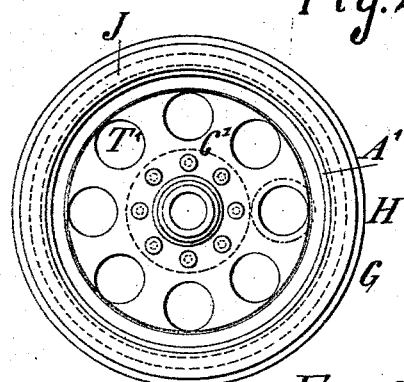
Figure 4B:
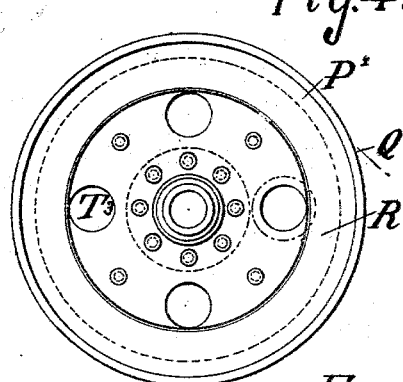

Figure 1 (*a* and *b*) shows respectively a section and a plan of a wheel with a single disk and a plain rim. Fig. 2 (*a* and *b*) shows such a wheel with a rim of U section with a rectangular bandage surrounding it. Fig. 3 (*a* and *b*) is a wheel with a double disk and an angle iron rim. Fig. 4 (*a* and *b*) is a wheel for heavy loads with a double disk and a rim fitted thereto in another manner. Figs. 5 and 5ª is a plan and a section of a wheel in a larger scale showing distinctly the half round lining of the edges of the holes cut into the disks, the left part of each figure showing the design Figs. 3 and 3ª, the right part being taken from Figs 4ª and 4ᵇ.

As stated above I use instead of spokes a disk of wrought iron or steel pressed out of a plate in form of a shallow disk or cup having a flange A, a hollow circular groove B next to the flange, and the flat inner part C, and in the middle a circular hole, by means of which the disk is attached to the boss D to which it is then fixed either by rivets or screws as shown in Figs. 1ª and 1ᵇ. Round this disk I put a solid rim or bandage F of comparatively great thickness in radial direction. This rim is held upon the disk flange A by countersunk rivets or screw bolts with countersunk heads at the outer circumference.

In order to be able to take hold of the wheel in a similar manner as one can take hold of the spokes of an ordinary wheel, and assist, in case of need, the turning forward of the vehicle, holes T may be cut into the disk, and to give a better holding surface, these holes may be lined with circular rings of same diameter and of half round section as indicated by dotted lines at the right side of Fig. 1ª and at one of the holes of Fig. 1ᵇ.

Fig. 2 (*a* and *b*) shows a wheel made according to my invention and differing from the preceding example only by the use of a rim of other section.

I use again a disk exactly like the one described, having a flange A', a groove B' and a flat inner part c', into which holes b' may be cut and which is secured in the same way to a boss D'. But instead of using a bandage of plain bar section, I now employ a rim G of U section, in order to gain more radial depth without increasing too much the weight and into or round this jaunt I place a bandage of bar iron H which is joined to the U shaped rim by rivets or bolts and an intermediate piece I, forming a ring made of two halves.

When making wheels for heavy loads I again use a disk K made of plates as before and I combine it with a boss D² in the now well known manner and surround it by a felly rim L of angle iron section, in order to receive the necessary radial depth required for the felly at one side. For the sake of strengthening the single disk K, I put upon it a second one K', which is also pressed out of plate iron or steel to proper shape, hot or cold, in a suitable press, but instead of giving it a flange, as was the case with the other disks used, the outer part is left straight so that it may fit into a recess M, made in the face of the angle iron ring L, as shown by Fig. 3ª. It is then riveted together with the first disk to the boss D² and its circumference is secured to the angle rim by screws N. In thus making the second disk and fixing it to the felly rim, I at the same time obtain the required solid radial depth of the felly, which will prevent earth falling on the inner side, resisting and hindering the turning of the wheel, when on account of the heavy load or bad ground the wheels may have sunk into the earth. These double disks may be provided with holes T² in a similar manner as the single disks and in order to be able to take better hold of the wheel and assist the turning forward of the vehicle, as it was stated before, the edges of these holes may be lined with rings X of half round section as will be seen from Figs. 5ᵃ and 5ᵇ.

Figs. 4ᵃ and 4ᵇ show a wheel with a double disk made according to my process, in which the disks pressed out of steel or wrought iron plates have their outer circumference so shaped, that both put together appear like the jaws of a pair of tongs. I use these disks in the following manner. The disk O is put upon the boss D³, then the felly rim Q, having at its inner side edges recesses giving it a dovetail section, is placed upon the disk O, so that its jaw like outer part P enters into the recess; the other disk R is then put upon the boss and onto the rim Q, so that also the jaw like part P' of it enters into the recess on the upper side of the rim and that this is held between the two disks as in a pair of circular tongs, the two disks are then secured to the boss of the wheel and firmly riveted together so that the felly rim is held between them in an absolutely safe manner. The tong shape of the two disks makes them act like stays and a wheel of this construction will be able to resist the heaviest loads.

The wheels made according to my method are almost indestructible, there being no spokes, but instead of them the strong disk plate, the "fellies" are supported and stayed all round, even a shot, when such wheels are used for cannon carriages (lafette) can not damage such a wheel so much that it would be useless, for the shot can only deform the disk or strike through it, without materially influencing the capacity of bearing of the wheel, whereas in ordinary wheels, when a spoke has been broken, the wheel itself in most cases is unable to bear a load at that special point.

The only objection that might be made against these wheels is the ringing or bell like sound they make, this however may be greatly diminished by using wood fillings between the joints of the disks, of the disks and boss and the fellies respectively.

On the other side my wheels can be made very cheaply and absolutely all to the same size exactly, there being hardly any hand labor required.

Having now particularly described my invention, I declare that what I claim, and desire to secure by Letters Patent, is—

1. A car wheel having the tire or rim F connected to the boss by a circular plate having a flat part $b$ and holes T cut therein, a channel shaped depression B at the circumference and a flange A to which the tire or rim F is riveted or bolted.

2. A car wheel having the tire or rim connected to the boss by a circular plate said plate having a flat part, holes cut therein, a channel shaped depression, a flange at its circumference to which is riveted the rim, and bolted or riveted thereunto a similar plate K' which is pressed into dish shape and has its outer edge riveted or bolted to the side edge of the tire.

AUGUST LUDWIG SCHMIDT.

Witnesses:
W. OTTO,
D. J. PARTELLO.